(12) United States Patent
Yan et al.

(10) Patent No.: US 9,343,964 B2
(45) Date of Patent: May 17, 2016

(54) $I^2$ AVERAGE CURRENT MODE (ACM) CONTROL FOR SWITCHING POWER CONVERTERS

(71) Applicant: Virginia Tech Intellectual Properties, Inc., Blacksburg, VA (US)

(72) Inventors: Yingyi Yan, Blacksburg, VA (US); Fred C. Lee, Blacksburg, VA (US); Paolo Mattavelli, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 170 days.

(21) Appl. No.: 14/154,835

(22) Filed: Jan. 14, 2014

(65) Prior Publication Data

US 2014/0292288 A1    Oct. 2, 2014

Related U.S. Application Data

(60) Provisional application No. 61/806,545, filed on Mar. 29, 2013.

(51) Int. Cl.
| | |
|---|---|
| G05F 1/56 | (2006.01) |
| H02M 3/156 | (2006.01) |
| G05F 1/565 | (2006.01) |
| G05F 1/46 | (2006.01) |
| H02M 1/00 | (2006.01) |

(52) U.S. Cl.
CPC ............... *H02M 3/156* (2013.01); *G05F 1/461* (2013.01); *G05F 1/565* (2013.01); *H02M 2001/0009* (2013.01)

(58) Field of Classification Search
CPC ............... H02M 3/156; H02M 2001/0009; G05F 1/461; G05F 1/465; G05F 1/565; G05F 1/575
USPC .................. 323/222–225, 268, 271, 282, 285
See application file for complete search history.

(56) References Cited

U.S. PATENT DOCUMENTS

| | | | |
|---|---|---|---|
| 6,414,469 B1* | 7/2002 | Zhou .................. | G05F 1/62 323/272 |
| 7,250,744 B2* | 7/2007 | Weng .................. | H02M 3/156 323/282 |
| 7,605,572 B2* | 10/2009 | Xu .................. | H02M 3/1588 323/274 |
| 2011/0316508 A1* | 12/2011 | Cheng .................. | H02M 1/14 323/282 |

* cited by examiner

*Primary Examiner* — Matthew Nguyen
(74) *Attorney, Agent, or Firm* — Whitham Curtis Christofferson & Cook, PC

(57) ABSTRACT

Providing a fast current sensor direct feedback path to a modulator for controlling switching of a switched power converter in addition to an integrating feedback path which monitors average current for control of a modulator provides fast dynamic response consistent with system stability and average current mode control. Feedback of output voltage for voltage regulation can be combined with current information in the integrating feedback path to limit bandwidth of the voltage feedback signal.

20 Claims, 10 Drawing Sheets

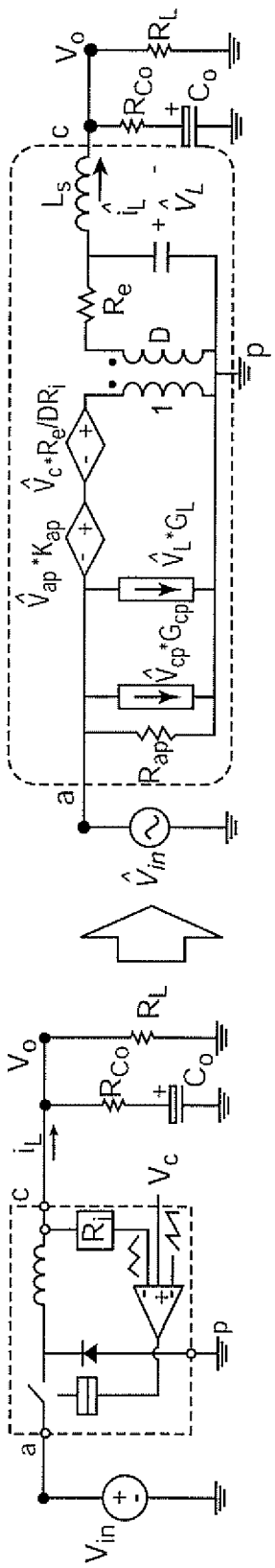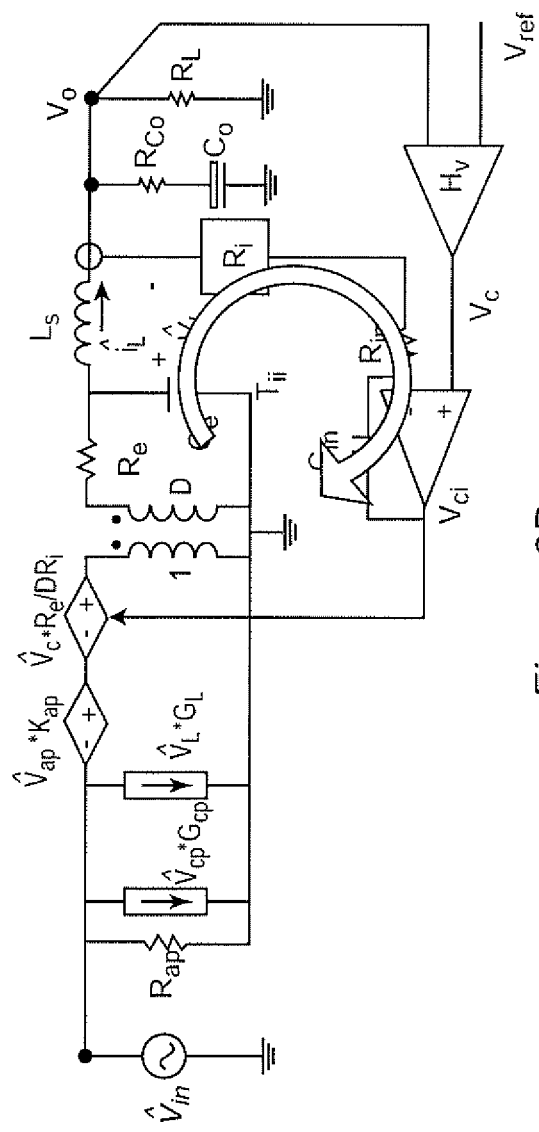
Figure 8A
Figure 8B

# I² AVERAGE CURRENT MODE (ACM) CONTROL FOR SWITCHING POWER CONVERTERS

CROSS-REFERENCE TO RELATED APPLICATIONS

This application claims benefit of priority of U.S. Provisional Patent Application 61/806,545, filed Mar. 29, 2013, which is hereby incorporated by reference in its entirety.

FIELD OF THE INVENTION

The present invention generally relates to switching power converters and, more particularly to peak current mode (PCM) control and average current mode (ACM) control switching power converters.

BACKGROUND OF THE INVENTION

Virtually all electronic devices require some type of power converter to assure that electronic circuits therein receive power at the appropriate voltage even when there is wide variation in the current drawn by the load that such circuits constitute. Many commercially available integrated circuits adopt peak current mode (PCM) control to supply power to the switching circuits therein. However, peak current mode control only controls the peak current but cannot provide accurate average current control. Further, peak current mode control suffers from sub-harmonic instability and an external ramp signal is required to stabilize operation. Providing an appropriate external ramp signal not only complicates the systems but substantially slows the loop response due to overcompensation to provide stability under worst-case input/output voltage and current conditions and variations in inductance value due to design preference, temperature variation and DC current bias. In contrast, average current mode (ACM) control is often used for various applications such as multi-phase voltage regulators (VRs), point of load (POL) converters, light-emitting diode (LED) drivers, battery chargers, power factor correctors and the like since they generally provide very precise current control, good current sharing in multi-phase converters and accurate over-current protection.

However, average current mode control for switching power converters presents two significant performance issues that tend to limit their suitability for some applications. First, ACM has potential sub-harmonic stability issues. Second, transient response is relatively slow while current commands for LED drivers, for example, can be large and rapid and, in applications where the required output current is transiently changed, average current mode control node can require a substantial number of switching cycles to settle at the new current value. Slow current transient response also leads to slow output voltage transient response in applications where fast, dynamic voltage response is required such as in voltage regulators for microprocessors. Third, since average current mode control is usually performed at a near constant switching frequency, the light load efficiency drops dramatically due to switching losses and driving losses when reduced current is supplied to the load.

Several approaches have been attempted to improve transient response by altering the structure of the current feedback loop but none have been entirely successful and none have addressed the issue of low light load efficiency even at the cost of substantial added complexity. Further, some approaches to improving transient response have introduced other limitations on applicability such as requiring operation in a continuous current mode (CCM) and being inoperable for discontinuous current mode (DCM) operation. These problems with known approaches to improving transient response will be discussed in greater detail below.

SUMMARY OF THE INVENTION

It is therefore an object of the invention to provide a switched power converter with average current mode control having rapid transient response.

It is a another object of the invention to provide an ACM control switching power converter having good transient response and capable of operating in a discontinuous current mode (DCM).

In order to accomplish these and other objects of the invention, an average current mode controller for a power converter and a power converter including such a controller are provided in which the controller comprises a current sensor connected to sense current in an inductor of said power controller and output a signal corresponding to the current in the inductor, an integrating feedback path to provide an average current signal to said modulator corresponding to the current signal output by said current sensor, and a current sensor direct feedback path to provide a signal corresponding the output of said current sensor directly to the modulator.

In accordance with another aspect of the invention, a method of controlling a power converter is provided comprising steps of sensing current in a load current path in the power converter to provide a current signal, integrating the current signal to provide an average current signal, controlling a modulator using both the current signal and the average current signal, and controlling switching in the power converter with an output of the modulator.

BRIEF DESCRIPTION OF THE DRAWINGS

The foregoing and other objects, aspects and advantages will be better understood from the following detailed description of a preferred embodiment of the invention with reference to the drawings, in which:

FIG. 8A illustrates derivation of a three-terminal switch equivalent circuit model, FIG. 8B is a schematic diagram of a small signal equivalent circuit model of the invention, FIG. 9 graphically illustrates the design of the integrating current loop, Tii, FIG. 10 graphically illustrates the control to $i_L$ transfer function using an ideal amplifier and a limited bandwidth amplifier.

DETAILED DESCRIPTION OF A PREFERRED EMBODIMENT OF THE INVENTION

Figure 1:
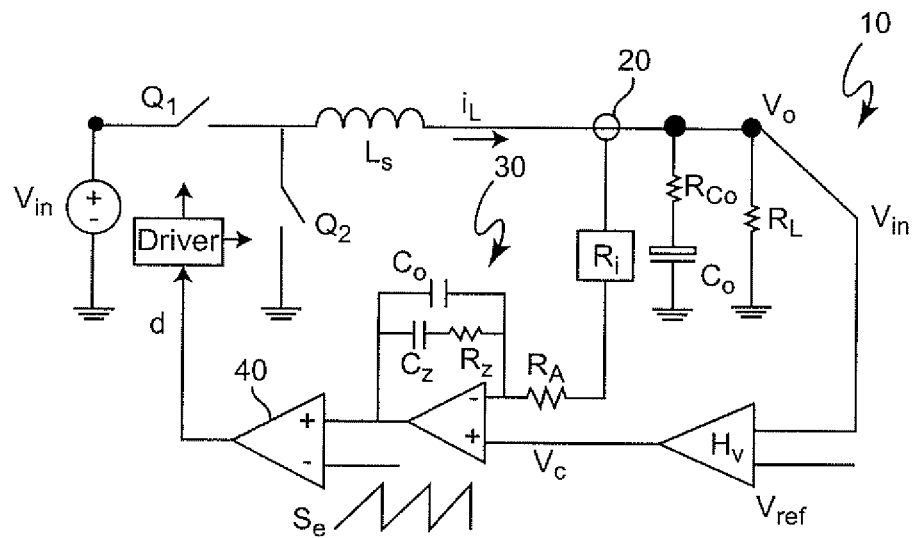
FIG. 1 is a schematic diagram of a known average current control mode buck converter with Type II compensator.
Figure 2:
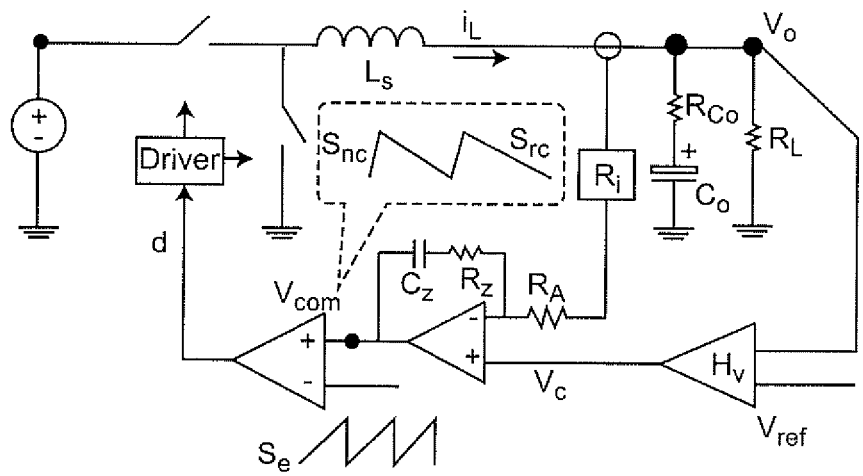
FIG. 2 is a schematic diagram of an ACM control buck converter with proportional-integral current compensator.
Figure 3:
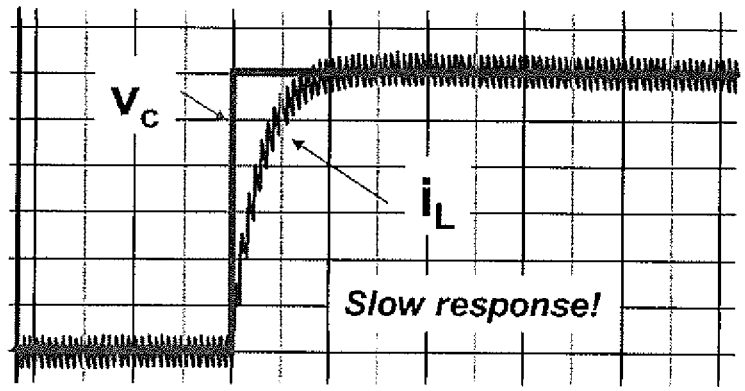
FIG. 3 is a graph of transient response to a step transient voltage or current control of an ACM control switching power converter.

Referring now to the drawings, and more particularly to FIG. 1, there is schematically shown an application of average current mode (ACM) control to a buck converter 10. While buck converters and ACM control are known, FIGS. 1-3 are arranged to convey an understanding of the problems addressed by the invention and no part of FIGS. 1-3 is admitted to be prior art in regard to the invention. These Figures are therefore labeled "Related Art". Further, while the invention will be described with reference to a buck converter which is chosen for the purpose in view of its familiarity and simplicity of constitution and operation, it is to be understood that the invention is applicable to any power converter topology and/or design.

As is well-known, the basic principle of buck converter operation is to alternately connect and disconnect an inductor and a power source with a switch Q1, also referred to as a top switch, causing current, $i_L$, in the inductor, $L_s$, to increase. As inductor current increases, a voltage is developed across the inductor that opposes or "bucks" the voltage applied from the power source. When the inductor is disconnected from the power source, switch Q2 is closed to conduct so-called freewheel current which decreases over time. However, the decrease in inductor current causes a voltage across the inductor which drives the freewheel current and supplies additional current to the load. The timing of the switching of Q1 and Q2 is controlled by sensing the output voltage, comparing the output voltage with a voltage reference and feeding the resultant signal, d in either analog or digital form back through a voltage feedback loop to control the driver circuit that determines to periods of conduction for Q1 and Q2. Small variations or ripple in the output voltage are smoothed by capacitor, Co, and its equivalent series resistance, Rco. Capacitor Co should be of sufficient value to supply current to the load during load transients where some latency exists in the feedback loop and control structure, particularly if transient response is slowed by ACM control, as alluded to above. Nevertheless, there will inevitably be a small generally triangular variation in current each switching cycle and an external ramp waveform is generally applied at a comparator 40 to provide stability.

ACM control can be added to the switching power converter of FIG. 1 by inclusion of a current sensor 20 in the output path, applying a suitable transfer function to the output of the current sensor and providing the resulting signal as an input to a compensator 30 comprising an operational amplifier having a feedback circuit to the current feedback loop that causes integration or averaging of the current feedback signal level over time. The voltage feedback signal is applied to the other input while the current feedback path provides negative feedback to the driver. The constitution of current sensor 20 is not important to the successful practice of the invention and any sensor having a suitably low series or output resistance such as a small resistance or an inductively coupled sensor or transformer winding can be used, any of which should be understood to be collectively illustrated by the current sensor shown in FIG. 1, 2, 4, 7 or 8. This feedback circuit can be designed to provide very precise current control but the integration function of the feedback circuit results in slow transient response.

Compensator 30 has a transfer function having one low frequency zero and one high frequency pole. This feedback circuit can be designed to provide very precise current control but the low pass filter function and external ramp of the feedback circuit results in slow transient response. It is well-known that ACM control, like any other constant frequency current mode control, can exhibit sub-harmonic instability and reduced dynamic response such that an external ramp is required to stabilize the current loop while the high-frequency pole reduces dynamic response.

In the implementation of compensator 30 the capacitor $C_p$ can be eliminated to eliminate the high-frequency pole in the power converter with proportional-integral (e.g. the output is proportional to the integral of the input) compensation as shown in FIG. 2. In this configuration, the zero of $R_z$ and $C_z$ should be well below one-half of the switching frequency, $f_{sw}$, and the ripple slopes at $V_{com}$, $s_{nc}$ and $s_{fc}$ are the amplified version of current slopes $s_n$ and $s_f$ during conduction periods of Q1 and Q2, respectively. In a manner similar to peak current mode control, the slope, $s_e$, of the external ramp input subtracted from the compensator output at a comparator 40 should be designed to damp the quality factor, Q, of double poles at $f_{sw}/2$ (e.g. Q=1). However, such design is difficult since slopes of $s_{nc}$ and $s_{fc}$ vary for several reasons including operation over a wide range of duty cycle such as in battery charger and power factor correction (PFC) applications and different input and output voltage combinations. Further, the inductor and current sensing components can vary by 90% to 150% or more from a nominal value due to manufacturing tolerances and temperature variation. The limited bandwidth of compensator 30 can cause slope distortion of the $V_{com}$ waveform. These are the possible causes of the loop instability issues of ACM control in practical power converter design and manufacture, integrated circuit controllers designed to be compatible with a wide range of inductor values and current sensor gains. For these reasons, most ACM integrated circuits apply a fixed large ramp to guarantee stability under a wide range of each of these variable conditions. However, by doing so, stability is guaranteed at the cost of over-compensation which compromises dynamic performance, as shown in FIG. 3.

In order to improve dynamic performance, hysteretic current mode control has been proposed to achieve average current control by controlling peak and valley current so that the current feedback is never overwhelmed by the external ramp waveform. In this approach, a band is established between upper and lower thresholds and switching instants are determined when the inductor current intersects the respective thresholds. That is, when the inductor current intersects the upper threshold, Q1 is turned off and Q2 is turned on. Conversely, when the inductor current intersects the lower thresholds, Q2 is turned off and Q1 is turned on. Therefore, the current feedback loop signal bandwidth and voltage feedback loop bandwidth are high. However, hysteretic current mode control can only control average current in a continuous conduction mode (CCM) and cannot function in a discontinuous conduction mode (DCM) and the switching frequency in this type of control is dependent on the actual value of the inductance which, as alluded to above, is subject to variation with temperature, DC current bias and manufacturing tolerances during operation (e.g. under variable load conditions). These drawbacks, in turn, cause difficulty in synchronization with upstream, downstream or parallel connected converters or system clock and input and/or output filter design.

In order to make switching frequency independent of inductor value, it has also been proposed to add a frequency regulation loop to change the width of the hysteretic band. However, such added complexity also fails to provide for operation in a discontinuous conduction mode. It has also been proposed to bypass the current compensator with a non-linear loop during a current step transient command. However, in such a case, the control circuit becomes even more complicated and light load efficiency is not improved.

Figure 4:
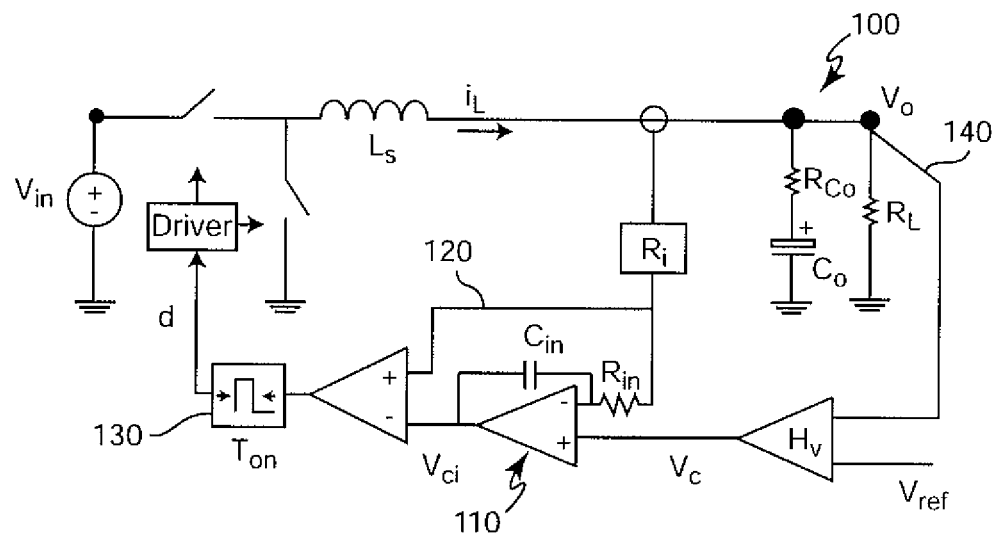
FIG. 4 is a schematic diagram of the I² control in accordance with the invention applied to a buck converter.

To solve these problems of known approaches to ACM control, reference is now made to FIG. 4 which shows a schematic diagram of a buck converter 100 with both a slow integrating current feedback loop 110 and a fast current sensor direct feedback loop 120 in accordance with the invention as well as an outer voltage feedback loop for voltage regulation. Since the current information is used twice in such a configuration, it is referred to a an $I^2$ average current mode control. This power converter configuration can be operated in a fixed on-time, fixed off-time or constant frequency (e.g. leading edge and/or trailing edge modulation), PWM mode. For simplicity, operation of the invention will be described in terms of a constant on-time mode of operation from which operation in other modes will be evident to those skilled in the art.

Figure 5:
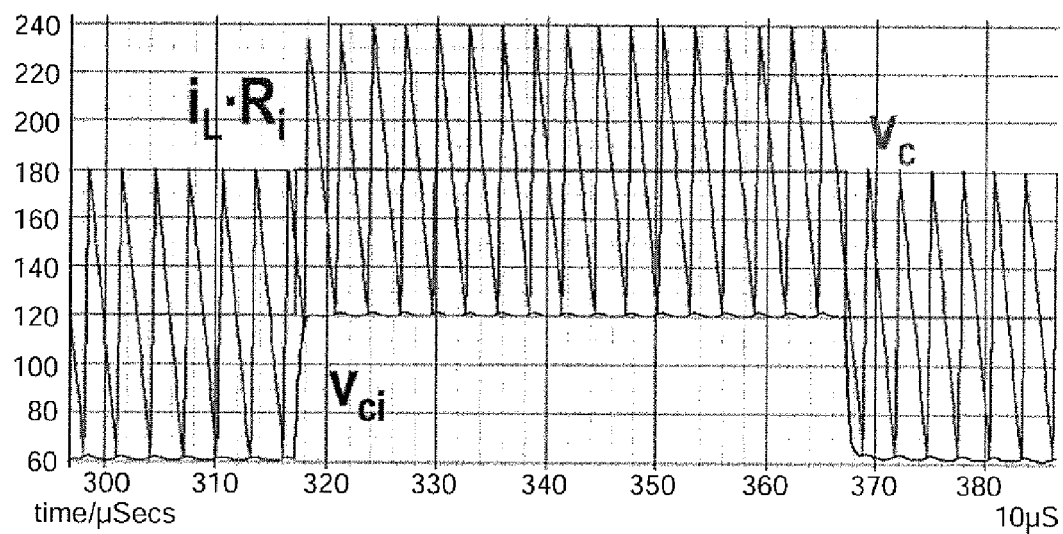
FIG. 5 is a graph of steady-state and transient response of the power converter of FIG. 4 in continuous current mode (CCM) operation.

Using constant on-time modulation, at the beginning of a switching cycle, the top switch, Q1, is turned on for a fixed duration of time. After Q1 is turned off and Q2 is turned on, the freewheel inductor current ramps down and the next switching cycle is initiated by the intersection of the voltage representing inductor current and the signal $v_{ci}$ which integrates the error between the average current command, $v_c$, and sensed inductor current. The integration provides a dynamic offset between $v_c$ and $v_{ci}$ to eliminate low frequency control error. From the small signal model of the arrangement of FIG. 4, it is seen that the control to $i_L$ transfer function is a flat gain except in a low frequency range. The inductor current does not precisely track the control signal $v_c$ at these low frequencies. Therefore low bandwidth and high gain are necessary for correction. The integration loop is of low bandwidth and high frequency components are strongly attenuated. However, during transients, the fast change of $v_c$ passes directly to $v_{ci}$ which is the threshold of the additional, fast current sensor direct feedback loop and the voltage is not required to change abruptly. Therefore, the switching frequency of $I^2$ average current mode control is independent of the inductor value and fast and accurate current control can be achieved without a requirement for an external ramp signal to achieve stability. A simulated response of the circuit of FIG. 4 to a current command, $v_c$, step transient during continuous conduction mode (CCM) operation is illustrated in FIG. 5.

Figure 6:
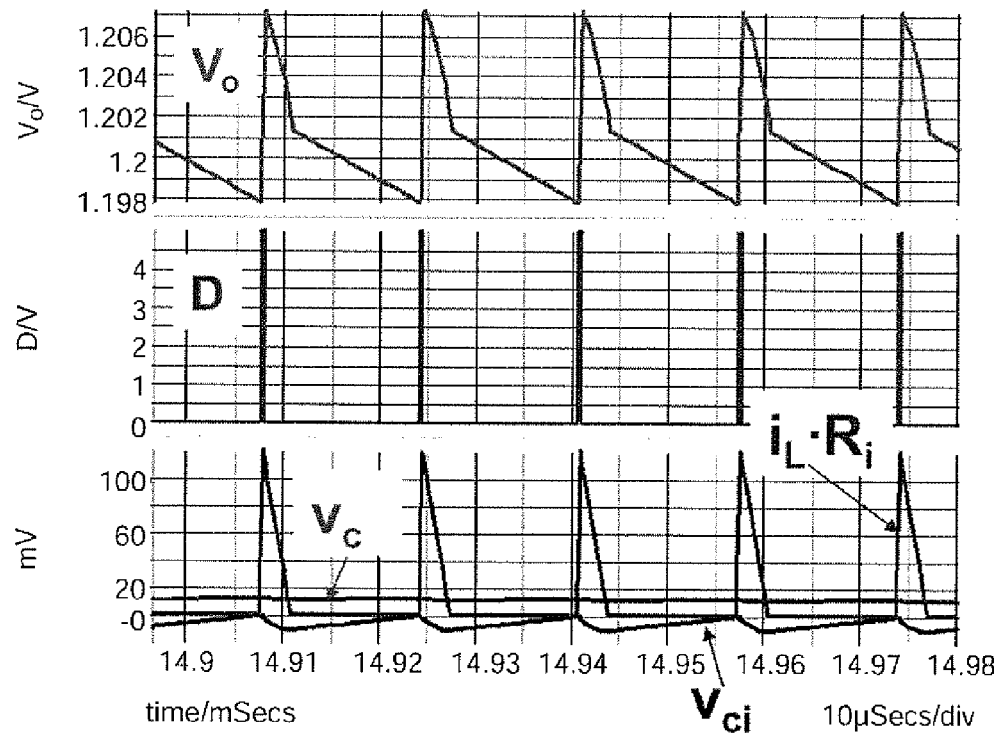
FIG. 6 is a graph of steady-state and transient response of the power converter of FIG. 4 in discontinuous current mode (DCM) operation.

It should also be appreciated that when the average current is below one-half of the inductor current ripple, the power converter circuit of FIG. 4 operates in discontinuous conduction mode (DCM). In DCM, the synchronous rectifier Q2 is turned off in response to the current in Q2 falling to zero to minimize efficiency loss due to reverse current flow and gate charge switching. That is, at low currents, $v_{ci}$ will drop below the zero current level and both switches Q1 and Q2 will remain off until $v_{ci}$ again rises above the zero level to initiate another cycle. During such a period when Q1 and Q2 are both non-conducting, the output filter capacitor supplies the load current until $v_{ci}$ rises above the zero current level to initiate another cycle. In this DCM, switching cycle frequency is proportional to load current at light loads. The steady-state waveforms of $I^2$ average current mode control in DCM are illustrated in FIG. 6.

Figure 7A:
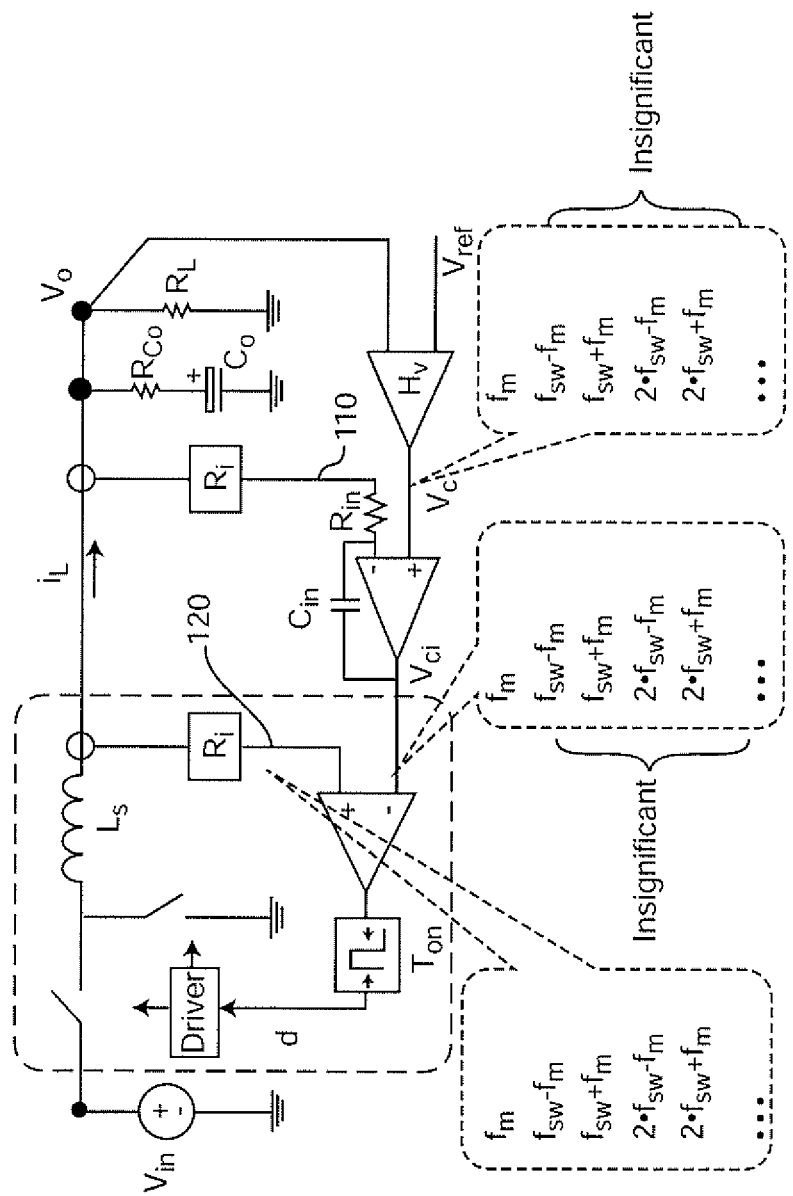
FIG. 7A is a schematic diagram of an I² control buck converter illustrating the frequency components of significance in small signal modeling of the invention, FIG. 7B graphically illustrates steady-state and transient response of I² control during CCM operation with sinusoidal perturbation.

FIG. 7A is a schematic illustration of the equivalent circuit of FIG. 4 arranged to show the frequency components of significance in analyzing the small signal modeling of the invention. In analyzing the small signal modeling of the invention, it should be noted that FIG. 7A differs from FIG. 4 in separating the direct and integrating current feedback loops by depicting two current sensors and the same transfer function, Ri, in both the direct and integrating feedback loops 110 and 120.

Figure 7B:
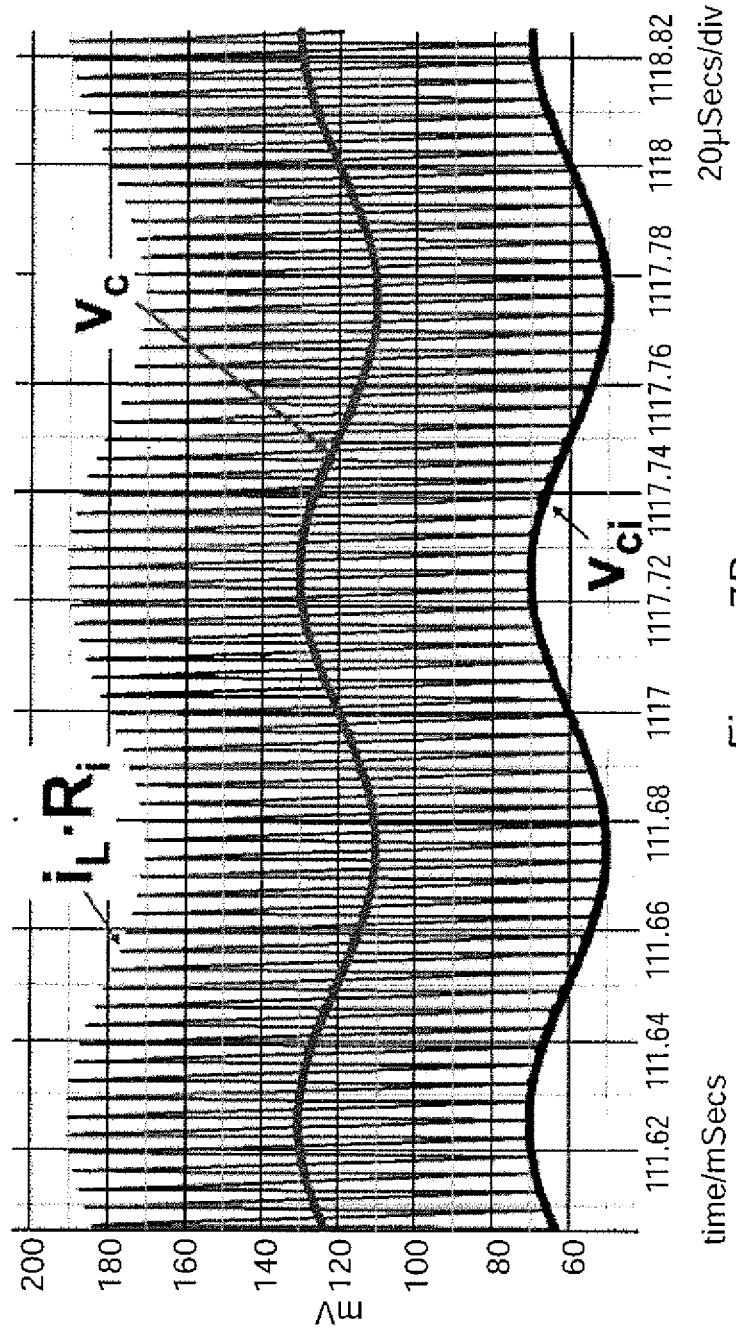

The inductor current direct feedback loop 120 does not include a low pass filter constituted by an integrator as does the integrating inductor feedback loop 110. Therefore all of the sideband frequency components (e.g. $f_{sw}-f_m$, $f_{sw}+f_m$, etc.) are fed back to the modulator 130. The function of the integration in the integrating current feedback loop is to eliminate the low frequency control error and thus integrating feedback loop 110 is a low bandwidth feedback path and sideband frequency components are attenuated to be substantially negligible as illustrated in FIG. 7A. The voltage feedback loop also includes the integrator and is thus also a low bandwidth feedback path and thus can be modeled as a linear transfer function. FIG. 7B shows waveforms of the current loops of the power converter of FIG. 4 or 7A under sinusoidal perturbation. It is evident that $v_c$ and $v_{ci}$ are dominated by the sinusoidal modulation frequency component while only the (proportional) current sensor direct feedback loop 120 contains high frequency components. Therefore, it is reasonable to consider sideband frequency components as being only in the feedback loop 120 and consider only the fundamental frequency in the integrating inductor current and output voltage feedback loop 110.

Therefore the current sensor direct feedback loop 120 is highly non-linear. Note that the sensing gain is linear but the loop is non-linear because the comparator constituting the PWM modulator is a non-linear component. A three-terminal switch equivalent circuit model based on the result of describing the function derivation as shown in FIG. 8A can accurately predict the small signal properties of the non-linearities up to $f_{sw}/2$, substituting the three terminal switch model for the closed current loop and the PWM modulator 130 as illustrated in FIG. 8B. The current loop depicted can be understood as a collective proportional current feedback loop. (Current mode controllers have a common sub-circuit with a, p and c terminals. The modeling shown in FIGS. 8A and 8B uses a linear time-invariant equivalent circuit to represent the small signal characteristic of the terminal currents when the current loop is closed.) This model is valid for both constant and variable frequency modulations. Thus, solving the equivalent circuit model, the gain is $$i_L(s)/v_{ci}(s) = (1/Ri)(R_e/R_e + R_L) \cdot \quad (1)$$
$$(1 + R_L C_o s/1 + (R_e \| R_L) C_o s) \cdot (1/1 + s(Q_1 \omega_1) + s^2/\omega_1^2)$$

where $R_e = L_s/(T_{on}/2)$, $\omega_1 = \pi/T_{on}$ and $Q_1 = 2/\pi$.

As shown in FIG. 5, the high frequency $v_{ci}$ to $i_L$ gain is determined by Ri. The high frequency double pole is beyond $f_{sw}/2$, while the quality factor Q is always a positive constant. Therefore the direct feedback loop is unconditionally stable for any and all operating points. Therefore, no external ramp signal is required for stability and there is thus no requirement that could result in overcompensation as alluded to above.

A low frequency pole and a low frequency zero are present in the transfer function of equation (1) above. The pole is always at a higher frequency than the zero, the position of the pole is $$\omega_p = 1/[(R_e \| R_L)C_o].  \quad (2)$$

Beyond the pole, the gain of equation (1) is solely determined by current sensing gain Ri.

Figure 9:
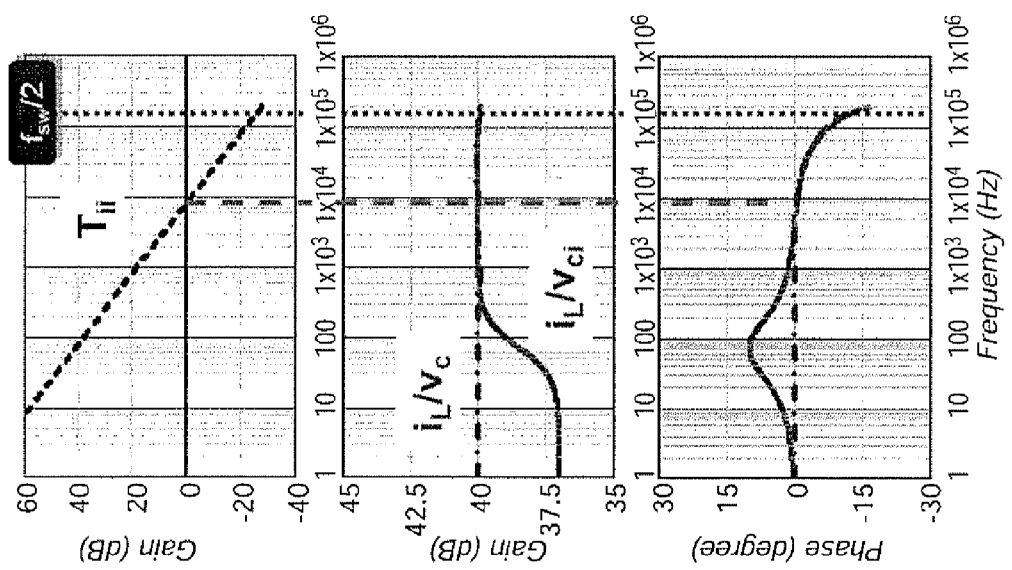

To eliminate low frequency control error, the goal of the current compensator is to boost low frequency gain below $\omega_p$. To do so the cross-over frequency of the integrating feedback loop 110 should be designed to be between $\omega_p$ and well below $f_{sw}$. FIG. 9 shows the effect of the integration loop to eliminate the current control error; providing for $i_L$ to track $V_c$ from DC to very high frequency. Thus, with both current loops closed, inductor current is well-controlled from DC to $\omega_1$ which is well beyond $f_{sw}/2$.

Figure 10:
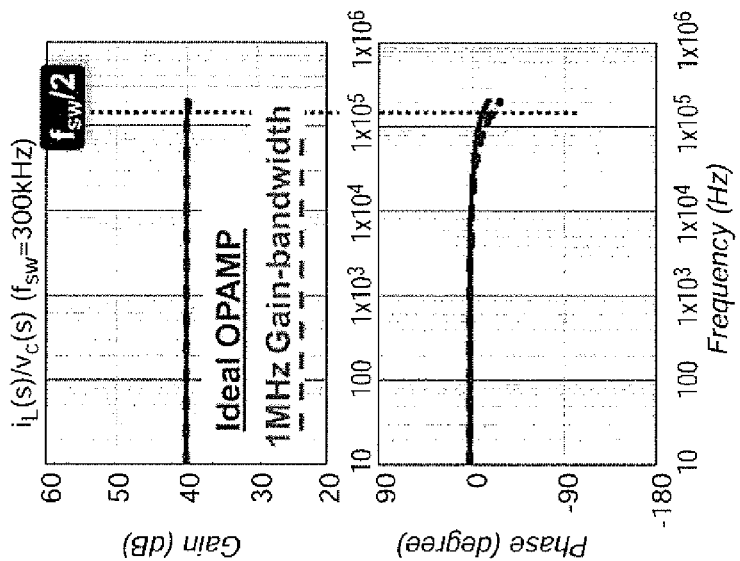

The current compensator only operates upon low frequency signals and, therefore, the operational amplifier in the integrator need not have a high gain-bandwidth product. Therefore, the invention allows implementation of the compensator with very inexpensive and readily available operational amplifiers. FIG. 10 illustrates a graphical comparison of the performance of such a low-end operational amplifier with an ideal amplifier providing the control-to-$i_L$ transfer function. It can be seen that the performance is virtually identical from very low frequencies up to $f_{sw}/2$.

Figure 11:
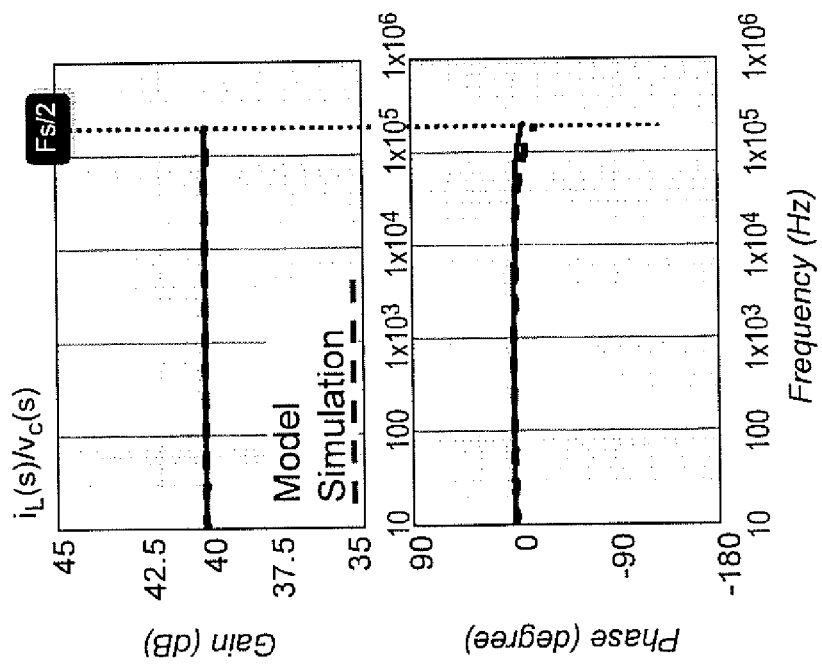
FIG. 11 is a graphical comparison of the performance of the small signal model in accordance with the invention and results of simulation, FIG. 12 graphically illustrates waveforms of the current controller in steady-state operation of the invention, FIG. 13 graphically illustrates the current step transient response of the invention.

FIG. 11 illustrates a graphical comparison of the small signal model with simulation results for a switching frequency of approximately 300 kHz, $V_{in}=12V$, $V_o=1.2V$, $L_s=300$ nH, $C_o=4.48$ mF, $R_L=0.1\Omega$ and current sensing gain Ri=10 mω. It is clearly seen that the small signal model is accurate to $f_{sw}/2$.

Figure 12:
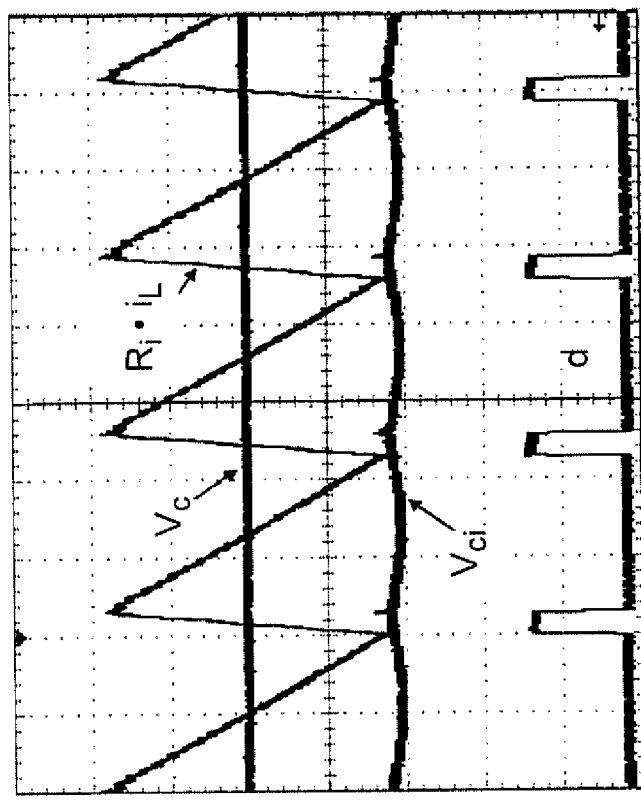
Figure 13:
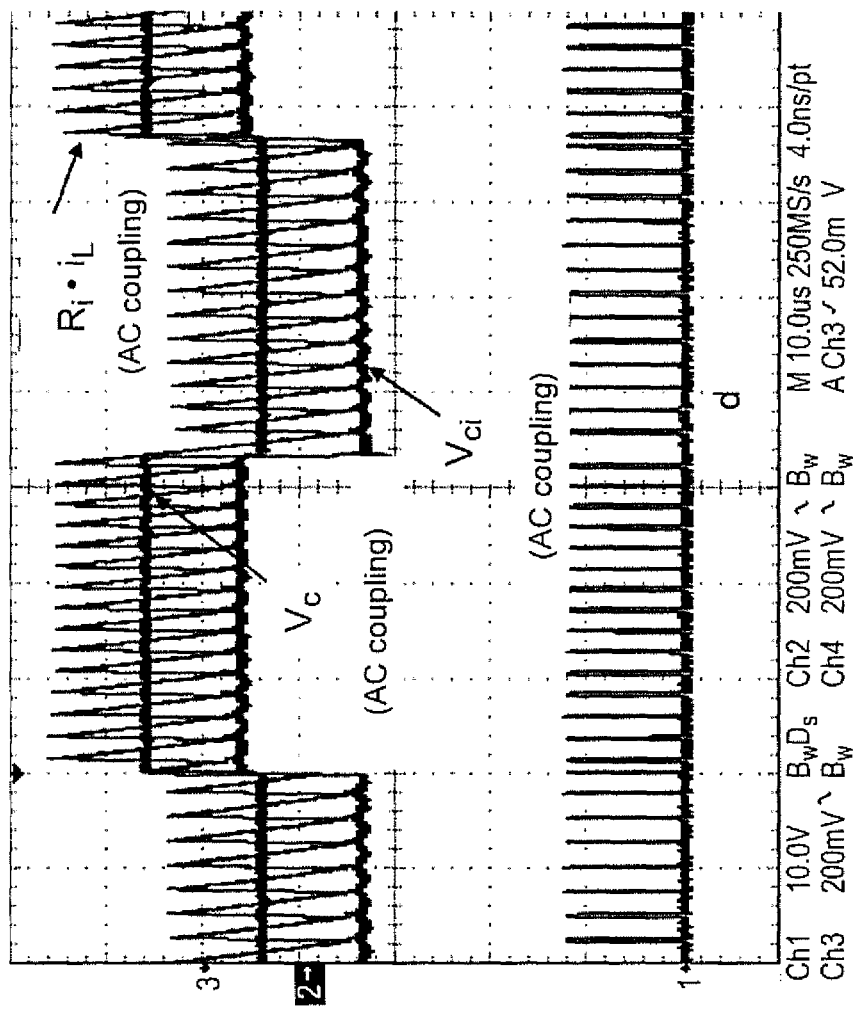
Figure 15:
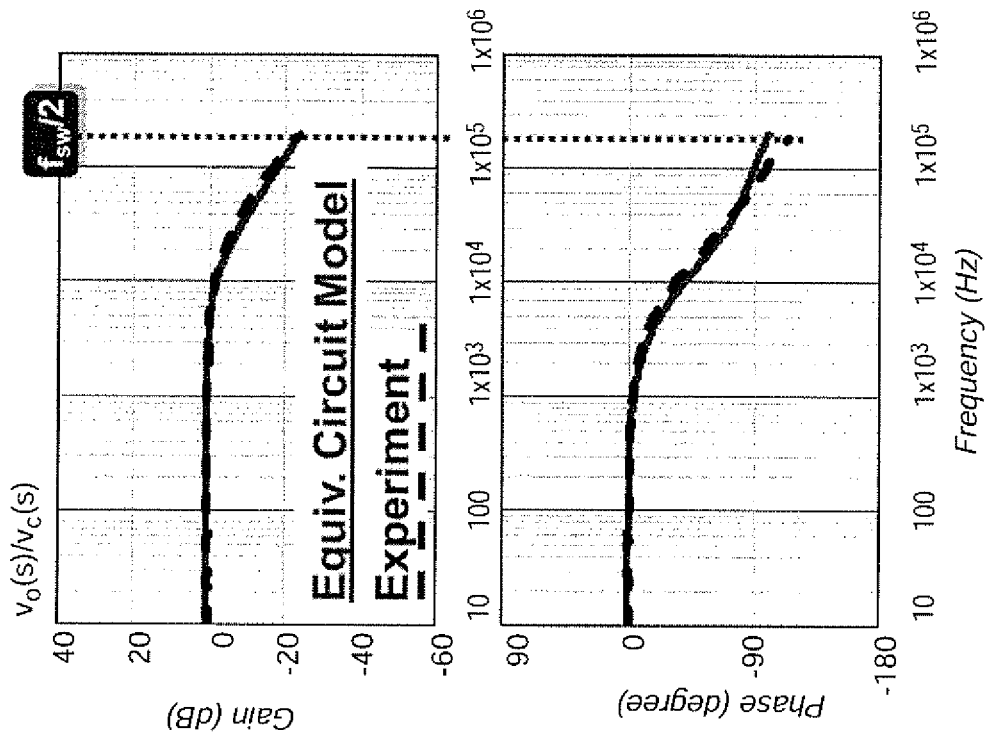
FIG. 15 illustrates the control to $v_0$ transfer function of $I^2$ control of the invention.
Figure 14:
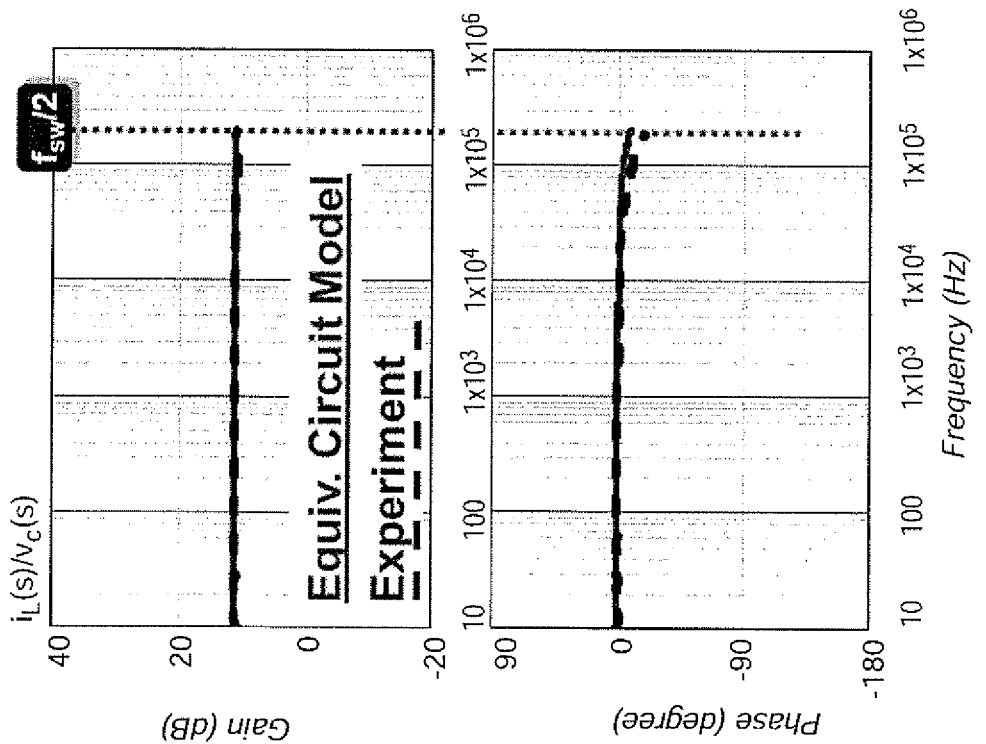
FIG. 14 illustrates the control to $i_L$ transfer function of $I^2$ control of the invention.

The efficacy of the invention for constant on-time I² average current mode control has also been experimentally verified as well as simulated. The experiment was performed using a buck converter prototype at $f_{sw}=400$ kHz, $V_{in}=12V$, $V_o=1.2V$, $L_s=2.2$ µH, $C_o=47$ µF, $R_L=0.3\Omega$ and current sensing gain Ri=0.28Ω. FIG. 12 illustrates the waveforms of the controller during steady-state operation. FIG. 13 show the current command step transient response to be extremely fast. The average inductor current follows the step change of current command $v_c$ in one switching cycle which compares very favorably with the response illustrated in FIG. 3. FIG. 14 shows a graphical comparison of control to inductor current transfer function and control to output transfer function. Thus it is clearly seen that the equivalent circuit model predicts the experimental measurements up to $f_{sw}/2$.

In view of the foregoing, it is clearly seen that the I² average current mode control of the invention avoids the slow transient response characteristic of previous approaches to conventional average current mode control and enables an average current mode controlled power converter to operate in discontinuous conduction mode (DCM) and to switch automatically between CCM and DCM based on load in order to maintain efficiency with light loads. Moreover, the invention allows unconditional stability to be achieved and eliminates any need for an external ramp waveform to be injected and thus avoids a common source of overcompensation. The simplified controller provided by the invention is of low cost and less complicated operation than other prior approaches to proving improved performance using average current mode control which have not been successful due to introduction of additional, application limiting problems. The invention can be implemented very simply by providing a fast, current sensor direct feedback loop in addition to the integrating current feedback loop required for averaging current with a voltage feedback loop for voltage regulation and allows the compensator to be implemented with an inexpensive operational amplifier since there is no need for the operational amplifier to have a high gain-bandwidth product.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An average current mode controller for a power converter comprising
    a current sensor connected to sense current in an inductor of said power converter and output a signal corresponding to said current in said inductor, and, in combination,
    an integrating feedback path to provide an integrated error signal to a modulator, said integrated error signal corresponding to said current signal output by said current sensor, and
    a current sensor direct feedback path to provide a signal corresponding to said output of said current sensor directly to said modulator.

2. The controller as recited in claim 1, wherein the power converter topology is a buck converter topology.

3. The controller as recited in claim 1, wherein said current sensor is an inductively coupled current sensor.

4. The controller as recited in claim 1, further including a voltage feedback path.

5. The controller as recited in claim 4, wherein said voltage feedback path provides an input to said integrating feedback path.

6. An average current mode control power converter comprising
    a power converter circuit including an inductor and a switching arrangement controlled by a modulator, and, in combination,
    a current sensor connected to sense current in said inductor and output a signal corresponding to said current in said inductor,
    an integrating feedback path to provide an integrated error signal to said modulator, said integrated error signal corresponding to said current signal output by said current sensor, and
    a current sensor direct feedback path to provide a signal corresponding said output of said current sensor directly to said modulator.

7. The power converter as recited in claim 6, wherein the power converter topology is a buck converter topology.

8. The power converter as recited in claim 6, wherein said current sensor is an inductively coupled current sensor.

9. The power converter as recited in claim 6, further including a voltage feedback path.

10. The power converter as recited in claim 9, wherein said voltage feedback path provides an input to said integrating feedback path.

11. A method of controlling a power converter, said method comprising steps of
    sensing current in a load current path in said power converter to provide a current feedback signal,
    integrating said current feedback signal to provide an average current feedback signal,
    controlling a modulator using both said current feedback signal and said average current signal, and controlling switching in said power converter with an output of said modulator.

12. The method as recited in claim 11, further including a step of
combining an output voltage feedback signal of said power converter with said average current feedback signal.

13. The method as recited in claim 12, wherein said combining said output voltage feedback signal with said average current feedback signal limits output voltage feedback loop bandwidth.

14. The method as recited in claim 11, wherein said modulator is a constant on-time modulator.

15. The method as recited in claim 11, wherein said modulator is a constant off-time modulator.

16. The method as recited in claim 11, wherein said modulator is a pulse width modulator.

17. The method as recited in claim 16 wherein said pulse width modulator is a leading edge modulator.

18. The method as recited in claim 16, wherein said pulse width modulator is a trailing edge modulator.

19. The method as recited in claim 11, wherein said current in a load current path is current in an inductor of said power converter.

20. The method as recited in claim 11, wherein said current in a load current path is monitored with a single sensor.

* * * * *